Patented Oct. 5, 1937

2,094,770

UNITED STATES PATENT OFFICE 2,094,770

DYEING OF ORGANIC DERIVATIVES OF CELLULOSE

George Holland Ellis and Henry Charles Olpin, Spondon, near Derby, England, assignors to Celanese Corporation of America, a corporation of Delaware No Drawing. Application September 21, 1933, Serial No. 690,421. In Great Britain October 8, 1932

6 Claims. (Cl. 8—5)

This invention relates to the manufacture of new azo dyestuffs and to the colouration therewith of textile and other materials, and in particular materials consisting of or containing cellulose acetate or other cellulose esters or ethers.

We have found that valuable new dyestuffs may be obtained by coupling diazo compounds obtainable by diazotizing 4-amino-3-nitro-benzenes substituted in the 1-position by alkyl, alkyloxy or other etherified hydroxyl group, halogen, or other substituent, with 3-amino-1-alkyl- or 1-alkyloxy-benzenes which couple in the para-position to the amino group, for example meta-toluidine. Especially valuable dyestuffs may be obtained with the aid, as coupling components, of mono-amino-1:4-dialkyl-, dialkyloxy-, or alkyl-alkyloxy-benzenes, for instance para-xylidine. A particularly valuable dyestuff may be obtained by coupling diazotized 4-amino-3-nitro-1-methyl-benzene with the aforesaid para-xylidine. By means of these dyestuffs valuable yellow to orange shades may be obtained upon cellulose ester or ether materials, which shades are characterized by excellent fastness properties and are readily dischargeable, for instance by means of reducing discharging agents.

In accordance with the present invention, therefore, new dyestuffs are produced by coupling diazo compounds obtainable by diazotizing 4-amino-3-nitro-benzenes substituted in the 1-position by alkyl, alkyloxy or other etherified hydroxyl group, halogen, or other substituent, with 3-amino-1-alkyl- or 1-alkyloxy-benzenes capable of coupling in the para-position to the amino group. As examples of suitable diazo components, mention may be made, in addition to the aforesaid 4-amino-3-nitro-toluene, of 4-amino-3-nitro-1-methoxy- or 1-ethoxy-benzene and 4-amino-3-nitro-1-chlorbenzene. Suitable coupling components are meta-toluidine and the mono-amino-1:4-dialkyl-, dialkyloxy- or alkyl-alkyloxy-benzenes for example para-xylidine, para-cresidine and amino-hydroquinone-dimethyl-ether, or N-alkyl derivatives thereof e. g. dimethyl-m-toluidine.

As previously mentioned, a particularly valuable dyestuff may be obtained by coupling diazotized 4-amino-3-nitro-toluene with para-xylidine. This dyestuff dyes cellulose esters or ethers in orange shades which are readily dischargeable by means of reducing discharging agents, for example stannous chloride discharges or zinc formaldehyde sulphoxylate discharges. The dyestuff has, moreover, an excellent affinity for cellulose esters and ethers and exhibits very good levelling properties. Further, the dyeings obtainable with the aid of this dyestuff on cellulose acetate are substantially non-phototropic, whereas, as is well-known, a large number of otherwise satisfactory yellow to orange dyeings on cellulose esters and ethers exhibit this defect to a high degree and are therefore commercially useless.

A particularly valuable application of this and other colouring matters of the present invention is for the production in conjunction with navy blue dyestuffs, of dischargeable black shades on cellulose esters or ethers, for example by first dyeing the materials in navy blue shades and thereafter topping the resulting dyeings with the yellow or orange dyestuffs or mixtures containing them. Valuable dischargeable black shades may for instance be produced on cellulose acetate by dyeing first with para-amino-benzene-azo-dimethyl-aniline, diazotizing and developing with β-oxy-naphthoic acid to a navy blue shade, and thereafter topping with the orange dyestuff from 3-nitro-4-amino-toluene and para-xylidine.

The new colouring matters, as indicated above, are of especial value for the colouration of cellulose acetate and other cellulose ester or ether materials. As examples of such other esters and ethers reference may be made to cellulose formate, propionate or butyrate or the products obtainable by esterifying cellulose while retaining its fibrous form, or the ethyl, benzyl or other ethers of cellulose. They may also be applied to mixed materials comprising one or more of the aforesaid cellulose esters or ethers in admixture with other textile fibres, for example wool, silk or other animal fibres, or cotton, regenerated cellulose or other cellulosic materials. Such other fibers may be coloured by the same dyestuffs as the cellulose esters or ethers when they possess the requisite affinity, or they may be coloured either in the same or different shades by means of other dyestuffs, either before, after or simultaneously with the colouration of the cellulose esters or ethers.

Colouration with the new colouring matters is preferably effected with the dyestuffs in substance, for which process of application the dyestuffs are eminently suited owing to their good affinity. If desired, however, they may be formed on the material, for example by applying the diazo component and thereafter diazotizing and developing with the coupling component.

The colouring matters are conveniently applied to the materials in the form of aqueous suspensions or dispersions, though if desired they may be applied from solutions in organic or other solvents.

The new dyestuffs may be obtained in dispersed form in any desired manner, for example by grinding, e. g., in colloid mills, by dissolving in a solvent and mixing with water containing or not containing protective colloids and/or dispersators, or by treatment with dispersing agents, whether alone or in the presence of protective colloids and/or liquids, e. g., water. Another method which may be employed is to effect the coupling in the presence of protective colloids with or without dispersing agents. Any desired dispersators may be employed, for example any of those mentioned in prior U. S. Patents Nos. 1,618,413, 1,618,414, 1,694,413, 1,690,481, 1,803,008, 1,840,572, and 1,716,721, and U. S. applications S. Nos. 390,423, filed 4th September, 1929, and 390,424, filed 4th September, 1929.

The dispersion may be effected in the dyebath itself. Conveniently, however, the dyestuffs are first brought into the form of more or less concentrated preparations, whether liquid or solid or semi-solid, adapted to yield by addition of water with or without further dispersation and/or protective colloids, aqueous suspensions or colloidal solutions which may be directly employed for the colouration of cellulose acetate or other organic substitution derivatives of cellulose. These preparations are included within the scope of the invention.

If desired the physical properties of the dyestuffs of the present invention may be improved in the manner described in U. S. applications S. Nos. 660,856, filed 15th March, 1933, and 679,312, filed 7th July, 1933, for example, the dyestuff prepared by diazotizing and coupling and filtering off, may be subjected to the action of steam. The dyestuffs may then be milled with water or otherwise converted into aqueous dispersions of superior keeping and dyeing properties.

The colouring matters may be applied to the materials in any convenient manner, for example by dyeing, padding or other method of uniform application, or by printing, stencilling or other mode of local application.

The invention is illustrated but not limited by the following examples:—

*Example I*

550 grams of 3-nitro-4-amino-toluene and 255 grams of sodium nitrite are made into a thin paste with hot water. The cooled paste is then slowly run into 1100 ccs. of hydrochloric acid 32° Tw. in 12 litres of cold water (10–15° C.). After stirring for 1–2 hours, the solution is run slowly into 437 grams of para-xylidine dissolved in 40 litres of water containing 450 ccs. of hydrochloric acid at 32° Tw. Stirring is continued for a time and then mineral acidity is neutralized by addition of sodium acetate solution and the dyestuff filtered off. It dyes cellulose acetate from an aqueous dispersion in orange shades readily dischargeable with zinc formaldehyde sulphoxylate.

*Example II*

In order to obtain a white pattern effect on a black ground on a cellulose acetate woven fabric, the fabric is first dyed by dispersion methods with 0.4 to 0.5% on the weight of the materials of para-amino-benzeneazodimethylaniline and diazotized and developed on the fibre with β-oxynaphthoic acid. The material which is dyed in navy blue is then topped in a neutral or preferably slightly acidic bath with 0.1 to 0.15% on the weight of the goods of 2-nitro-4-methyl-benzene-azo-para-xylidine according to the shade of black desired. The fabric is then printed with a discharge paste having the following composition:

| | Parts |
|---|---|
| Decrolin sol. conc. | 25 |
| Diethylene glycol | 10 |
| Ethyl lactate | 10 |
| Gum arabic and water | 55 |
| | 100 | and dried, aged for 5 minutes in a Mather & Platt ager, and washed off thoroughly and again dried when a white pattern is obtained on a black ground.

*Example III*

500 grams of a 10% aqueous paste of 2-nitro-4-methoxy-benzene-azo-meta-toluidine are heated with 250 grams of Turkey red oil until a uniform dispersion is obtained. The dispersion is then diluted on boiling with 2.5 grams per litre soap solution and the whole strained through muslin into 300 litres of a 0.5 gram per litre soap bath. A cellulose acetate woven fabric is entered into this dyebath and the temperature raised to 80° C., and maintained thereat until the requisite shade is obtained. The fabric is then rinsed and dried, a golden yellow shade being obtained. On printing locally with the discharge paste described in Example II a white discharge is obtained on a golden yellow ground.

What we claim and desire to secure by Letters Patent is:—

1. Process for the production of dischargeable blacks on textile materials of an organic derivative of cellulose, which comprises coloring the materials in a navy blue shade with a dischargeable dyestuff, and topping the materials with an orange or yellow dyestuff obtainable by coupling with a compound selected from the group consisting of 3-amino-1-alkyl, and 3-amino-1-alkyloxy compounds of the benzene series, a diazo compound obtainable by diazotizing a compound of the formula

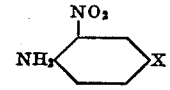

where X is alkyl, alkyloxy or halogen and the remaining positions of the benzene ring are occupied by hydrogen.

2. Process for the production of dischargeable blacks on cellulose acetate textile materials, which comprises coloring the materials in a navy blue shade with a dischargeable dyestuff, and topping the materials with an orange or yellow dyestuff obtainable by coupling with a compound selected from the group consisting of 3-amino-1-alkyl- and 3-amino-1-alkyloxy compounds of the benzene series, a diazo compound obtainable by diazoting a compound of the formula

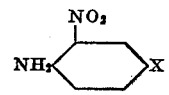

where X is alkyl, alkyloxy or halogen and the remaining positions of the benzene ring are occupied by hydrogen.

3. Process for the production of dischargeable blacks on cellulose acetate textile materials, which comprises coloring the materials in a navy blue shade with a dischargeable dyestuff, and topping the materials with a dyestuff obtainable by coupling with para-xylidine a diazo compound obtainable by diazotizing 4-amino-3-nitro-1-methyl-benzene.

4. Textile materials of an organic derivative of cellulose colored in a dischargeable black shade with a dischargeable navy blue dyestuff topped with an orange or yellow dyestuff obtainable by coupling with a compound selected from the group consisting of 3-amino-1-alkyl, and 3-amino-1-alkyloxy compounds of the benzene series, a diazo compound obtainable by diazotizing a compound of the formula

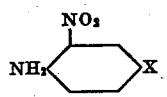

where X is alkyl, alkyloxy or halogen and the remaining positions of the benzene ring are occupied by hydrogen.

5. Textile materials of cellulose acetate colored in a dischargeable black shade with a dischargeable navy blue dyestuff topped with an orange or yellow dyestuff obtainable by coupling with a compound selected from the group consisting of 3-amino-1-alkyl, and 3-amino-1-alkyloxy compounds of the benzene series a diazo compound obtainable by diazotizing a compound of the formula

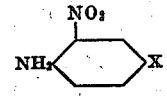

where X is alkyl, alkyloxy or halogen and the remaining positions of the benzene ring are occupied by hydrogen.

6. Textile materials of cellulose acetate colored in a dischargeable black shade with a dischargeable navy blue dyestuff topped with a dyestuff obtainable by coupling with para-xylidine a diazo compound obtainable by diazotizing 4-amino-3-nitro-1-methyl-benzene.

GEORGE HOLLAND ELLIS.
HENRY CHARLES OLPIN.